(12) United States Patent
Aukzemas (10) Patent No.: US 7,342,796 B2
(45) Date of Patent: Mar. 11, 2008

(54) CAPTIVE SHOULDER NUT ASSEMBLY

(75) Inventor: Thomas V. Aukzemas, Wilmington, DE (US)

(73) Assignee: Southco, Inc., Concordville, PA (US)

( * ) Notice: Subject to any disclaimer, the term of this patent is extended or adjusted under 35 U.S.C. 154(b) by 106 days.

(21) Appl. No.: 11/419,868

(22) Filed: May 23, 2006

(65) Prior Publication Data
US 2006/0275100 A1 Dec. 7, 2006

Related U.S. Application Data

(60) Provisional application No. 60/687,645, filed on Jun. 3, 2005.

(51) Int. Cl.
*H05K 7/20* (2006.01)

(52) U.S. Cl. ............... 361/719; 361/704; 361/709; 361/710; 165/80.3; 165/185; 257/718; 257/719; 24/453; 24/510

(58) Field of Classification Search ............... 361/704, 361/708–712, 717, 719, 720, 736, 752; 257/706–727; 174/16.3, 252; 165/80.3, 80.4, 185, 104.33; 24/297, 457, 458, 453; 411/510, 511
See application file for complete search history.

(56) References Cited

U.S. PATENT DOCUMENTS

| 1,472,405 A | 10/1923 | Amberton |
|---|---|---|
| 1,570,148 A | 1/1926 | Herr |
| 1,630,958 A | 5/1927 | Mauch |
| 1,854,730 A | 4/1932 | Bell |
| 1,997,821 A | 4/1935 | Gzupkaytie |
| 2,018,346 A | 10/1935 | Busby |
| 2,101,938 A | 12/1937 | Giberson |
| 2,151,255 A | 3/1939 | Witchger |
| 2,201,793 A | 5/1940 | Sanborn |
| 2,235,530 A | 3/1941 | Mercer |

(Continued)

FOREIGN PATENT DOCUMENTS

WO WO 02/48557 A1 6/2002

OTHER PUBLICATIONS

Southco Latches and Access Hardware, North American Addition n-47 NA, pp. C-28 and C-32 (3 pages).

(Continued)

*Primary Examiner*—Michael Datskovskiy
(74) *Attorney, Agent, or Firm*—Paul & Paul (57) ABSTRACT

A captive shoulder nut assembly, to hold a heat sink onto a PC board, has a nut member with a threaded portion and a tubular portion extending therefrom. The nut member mates with an upstanding threaded stud. A biasing compression spring rides over the nut with an end coil loop secured to the nut. The nut's tubular portion is suitable for insertion through a straight hole in the heat sink, with the spring remaining above the hole and operating against the heat sink. The free end of the tubular portion can be flared to a larger diameter than the hole, thereby captivating it to the heat sink and permitting movement by the nut through the hole while acting against the spring force. A stop shoulder on the nut and a projecting shoulder on the stud define the length travel of the nut onto the stud and establishes a pre-load compression force on the spring. A self-centering structure included for the nut to engage the stud.

17 Claims, 3 Drawing Sheets

U.S. PATENT DOCUMENTS

| | | |
|---|---|---|
| 2,345,650 A | 4/1944 | Attwood |
| 2,430,884 A | 11/1947 | Howard |
| 2,464,133 A | 3/1949 | Herbert |
| 2,672,659 A | 3/1954 | Becker |
| 2,737,222 A | 3/1956 | Becker |
| 2,991,904 A | 7/1961 | Blaise |
| 3,093,222 A | 6/1963 | Christofferson et al. |
| 3,204,680 A | 9/1965 | Barry |
| 3,209,806 A | 10/1965 | Currier et al. |
| 3,250,559 A | 5/1966 | Sommerfeld |
| 3,263,728 A | 8/1966 | Lynch |
| 3,295,578 A | 1/1967 | Maloof |
| 3,437,119 A | 4/1969 | Dey |
| 3,451,668 A | 6/1969 | Robinson |
| 3,461,769 A | 8/1969 | Brosseit |
| 3,465,803 A | 9/1969 | Ernest et al. |
| 3,490,509 A | 1/1970 | Otteson et al. |
| 3,502,130 A | 3/1970 | Gulistan |
| 3,589,423 A | 6/1971 | Metz |
| 3,594,876 A | 7/1971 | Gunther |
| 3,723,946 A | 3/1973 | Weatherup et al. |
| 3,728,933 A | 4/1973 | Grube |
| 3,816,010 A | 6/1974 | DiRago |
| 3,843,080 A | 10/1974 | Imai et al. |
| 3,847,422 A | 11/1974 | Gulistan |
| 3,877,339 A | 4/1975 | Muenchinger |
| 3,892,031 A | 7/1975 | Bisbing |
| 3,912,411 A | 10/1975 | Moffat |
| 4,088,355 A | 5/1978 | Dey |
| 4,204,566 A | 5/1980 | Kirrish et al. |
| 4,464,091 A | 8/1984 | Molina |
| 4,493,470 A | 1/1985 | Engel |
| 4,557,653 A | 12/1985 | Hill |
| D283,591 S | 4/1986 | Swanstrom |
| 4,720,223 A | 1/1988 | Neights et al. |
| 4,810,143 A | 3/1989 | Muller |
| 4,828,441 A | 5/1989 | Frasca |
| 4,863,326 A | 9/1989 | Vickers |
| 4,911,592 A | 3/1990 | Muller |
| 4,915,557 A | 4/1990 | Stafford |
| 5,042,880 A | 8/1991 | Garuti et al. |
| 5,059,075 A | 10/1991 | Kelly |
| 5,094,579 A | 3/1992 | Johnson |
| 5,175,665 A | 12/1992 | Pegg |
| 5,338,139 A | 8/1994 | Swanstrom |
| 5,382,124 A | 1/1995 | Frattarola |
| 5,384,940 A | 1/1995 | Soule et al. |
| 5,393,183 A | 2/1995 | Hinton |
| D357,176 S | 4/1995 | Ernest et al. |
| 5,462,395 A | 10/1995 | Damm et al. |
| 5,475,564 A | 12/1995 | Chiou |
| 5,538,464 A | 7/1996 | MacKay, Jr. |
| 5,544,992 A | 8/1996 | Ciobanu et al. |
| 5,558,480 A | 9/1996 | Kazino et al. |
| 5,611,654 A | 3/1997 | Frattarola et al. |
| 5,638,258 A | 6/1997 | Lin |
| 5,653,481 A | 8/1997 | Aulderman |
| 5,662,163 A | 9/1997 | Mira |
| D391,844 S | 3/1998 | Ropponen et al. |
| D392,179 S | 3/1998 | Ropponen et al. |
| 5,730,465 A | 3/1998 | Kou |
| 5,738,531 A | 4/1998 | Beaman et al. |
| 5,743,692 A | 4/1998 | Schwarz |
| 5,755,276 A | 5/1998 | Chiou |
| 5,779,288 A | 7/1998 | Amelio |
| 5,828,553 A | 10/1998 | Chiou |
| 5,845,673 A | 12/1998 | Paul |
| 5,881,800 A | 3/1999 | Chung |
| 5,903,434 A | 5/1999 | Chiou |
| 5,941,669 A | 8/1999 | Aukzemas |
| 5,999,402 A * | 12/1999 | Jeffries et al. ............... 361/687 |
| 6,025,994 A | 2/2000 | Chiou |
| 6,055,159 A | 4/2000 | Sun |
| 6,059,503 A | 5/2000 | Johnson |
| 6,079,920 A | 6/2000 | Dispenza |
| 6,101,096 A | 8/2000 | MacGregor et al. |
| 6,105,215 A | 8/2000 | Lee |
| 6,112,378 A | 9/2000 | Lee |
| 6,139,113 A | 10/2000 | Seliga |
| 6,139,237 A | 10/2000 | Nagayama |
| 6,164,980 A | 12/2000 | Goodwin |
| 6,179,697 B1 | 1/2001 | Shibai |
| 6,182,958 B1 | 2/2001 | Sidone et al. |
| 6,238,155 B1 | 5/2001 | Aukzemas et al. |
| 6,246,584 B1 | 6/2001 | Lee et al. |
| 6,250,375 B1 | 6/2001 | Lee et al. |
| 6,280,131 B1 | 8/2001 | Ellis et al. |
| 6,282,761 B1 | 9/2001 | Bewley et al. |
| 6,295,203 B1 | 9/2001 | Lo |
| 6,307,748 B1 | 10/2001 | Lin et al. |
| 6,309,156 B1 | 10/2001 | Schneider |
| 6,311,765 B1 | 11/2001 | Lo et al. |
| 6,318,452 B1 | 11/2001 | Lee |
| 6,374,906 B1 * | 4/2002 | Peterson et al. ............ 165/80.3 |
| 6,379,234 B1 | 4/2002 | MacKay |
| 6,439,816 B1 | 8/2002 | Nance et al. |
| 6,480,387 B1 * | 11/2002 | Lee et al. ................... 361/704 |
| D472,797 S | 4/2003 | Ellis et al. |
| 6,644,903 B1 | 11/2003 | Arand |
| D484,031 S | 12/2003 | Ellis et al. |
| 6,679,666 B2 | 1/2004 | Mizuno et al. |
| D494,458 S | 8/2004 | Aukzemas et al. |
| 6,769,850 B2 | 8/2004 | Lay |
| 6,786,691 B2 | 9/2004 | Alden, III |
| 6,826,054 B2 * | 11/2004 | Liu ............................ 361/719 |
| 6,866,456 B2 | 3/2005 | Bentrim |
| 2001/0024607 A1 | 9/2001 | Frattarola |
| 2003/0007844 A1 | 1/2003 | Terry |
| 2004/0081529 A1 | 4/2004 | Stanton et al. |
| 2004/0165966 A1 | 8/2004 | Aukzemas et al. |

OTHER PUBLICATIONS

Fairchild Fasteners, Captive Screws, Tridair Products (14 pages).
ITW Fastex, web page www.itw-fastex.com/newprods.htm, Aug. 21, 2001 (2 pages).
ITW Fastex, web page www.itw-fastex.com/cgi-bin/itwfastex/052, Oct. 17, 2002 (1 page).
Photograph of IBM Heat Sink for IBM Xseries 345 Server, p. 1, 2003 (1 page).
Photograph of Heat Sink Captive Screw by Shuttle, p. 1 and 2, 2003 (2 pages).
Photographs of Swiftech MCX 603 Heat Sink, p. 1 and p. 2, 2002 (2 pages).
Photographs of MSI Hermes 845 GV Heat Sink with Heat Sink Captive Screw installed, p. 1 and 2, and with O-ring, 2002 (3 pages).
Hardcore Cooling, web page www.hardcorecooling.us/product.asp?3=413, pp. 1-6 (6 pages).
Fairchild Fasteners, South Bay & Kelkheim Operations, Captive Screws (5 pages).
Captive Fastener Corporation, Self-Clinching Slide-Top Standoffs, Series CFSKC, p. 56 (1 page).
Captive Fastener Corporation, Spring-Top Standoffs, Series CFSSA, CFSSS & CFSSC, p. 59 (1 page).
ITW Fastex, Auto Heatsink Clip, part No. 8033-00-9909, Aug. 15, 2000 (1 page).
Penn Engineering, "The Self-Clinshing Fastener Handbook", 2002, p. 15.
Air Force Qualification Training Package (AFQTP 3E1x1-12) for HAVAC/R Module 12 piping/tubing, Dec. 2002, pp. 10-12.
www.grainger.com/industrial-supplies/Benders1A217.html.
www.dictionary.com, Definition of "swaging" according to the American Heritage Dictionary of the English language, 4th ed.

www.dictionary.com, Definition of "flaring" according to the American Heritage Dictionary of the English language, 4th ed.
www.websters-dictionary-online.net/fl/flaring.html, Definition of "flaring" according to WorldNet 1.7.1. Copyright 2001, Princeton University.

www.ridgidforum.com/cgi-bin/ultimatebb.cgi?ubb=get_topic;f=14;t=000062.

* cited by examiner

CAPTIVE SHOULDER NUT ASSEMBLY

RELATED APPLICATIONS

This application claims priority of U.S. provisional application 60/687,645, filed Jun. 3, 2005, for captive shoulder nut assembly, and incorporates by reference the disclosure of that application in the entirety.

BACKGROUND OF THE INVENTION

This invention relates to heat sinks and especially to fasteners and nut assemblies use to attach or tie-down heat sinks to printed circuit boards and/or microelectronic circuit "chips".

In assembling electronic components and modules, inserts, spacers and standoffs have been often used. The attachment of components and parts has been accomplished by screws, spring clips, clamps and other such devices. In a chassis for holding electronic components, space for the manual manipulation of parts, fasteners, and tools is often an issue.

Captive fasteners, such as captive screws and captive nuts are devices used to fasten two components/objects together, where the fastener remains with one of the components when loosened. Typically included with these fasteners is a tie-down spring which permits the alignment and other movement between the two fastened objects.

The captive fastener is "caught" to a component/object by a flange, a ferrule, a spring clip or the like. This retaining structure prevents the total removal of the captive fastener from that component.

Modern large scale integrated (LSI) circuits, microprocessors, microchips and other integrated circuit devices (IC chips) generate a substantial amount of heat, especially when operating at very high frequencies. Such heat generation can amount to 10's of watts and even 100's of watts of heat per hour. It has become imperative to mount heat sinks on these IC chips to dissipate as much heat as possible. In such instances the heat sink is mounted to the circuit board, or mounted to a mounting frame, which in turn is mounted to the circuit board on which the IC chip is also mounted.

Spring clips have been used to secure heat sinks, but are sensitive to vibration. They often interfere with the heat transfer fins on the heat sink and are often hard to positively snap into place and to release.

Captive fasteners have provided and improvement over heat sink clips. Two or four captive fasteners, such as screws or nuts, are used to engage respective flanged corners of a heat sink. These captive fasteners have threaded ends which usually engage a threaded ferrule or a threaded bushing, or a threaded screw/bolt mounted into a hole through the PC board.

Oftentimes a sheet of compressible elastomeric heat transfer polymeric material is used between the top surface of the IC chip and the bottom of the heat sink. This heat transfer interface material takes up for any surface irregularities in the mating IC chip and heat sink thereby providing the greatest positive surface contact.

Captive fasteners for IC chip heat sinks, with heat transfer polymeric sheeting, have incorporated spring tie-downs. The tie-down force exerted on the heat sink is the total of the spring forces of the compressed springs. This structure permits each heat sink to "float", i.e., to move through expansion and contraction phases as the IC chip temperature changes.

The chassis (i.e., chip size) of microprocessor and electronic modules is becoming smaller with smaller footprints. As more boards are crowded into tightly spaced cases or into tightly spaced racks in a chassis, the size and position of heat sink tie-down screws, including captive fasteners, becomes an issue. The alignment of the heat sink during its mounting over an (integrated circuit) IC chip requires an ease of alignment of the captive fasteners with the board mounted receiving members (an easy operation in the alignment of the fasteners). This can require, generally, two hands and some lateral movement. This lateral movement can jeopardize the integrity of the printed circuit coating, and can create a missalignment of the interface polymer heat transfer pad on the IC. There is also an issue with the tightened fasteners and the tie-down force exerted by the spring.

What is desired is a self-aligning nut-type structure for use with board mounted studs for securing a heat sink to an IC chip.

What is also desired is to provide this nut structure captivated to the heat sink base.

What is further desired is to provide this nut structure with a spring tie-down, whereof the nut can float on the heat sink base and the spring exerts the tie-down force, What is also further desired is to provide this nut structure with a positive adjustment for setting the spring force to a consistent predetermined spring force.

SUMMARY OF THE INVENTION

The objectives of the present invention are realized in a captive nut assembly for securing a heat sink base to a PC board over an IC chip. A plurality of captive nuts are used to hold the heat sink, with each nut engaging an upstanding threaded screw, i.e., a bolt or a threaded stud. Each bolt or stud in turn is mounted in the PC board and becomes a part of the entire assembly. A compression spring mounted onto a nut exerts a tie-down pressure on the heat sink base to drive/bias it towards the IC chip and PC board. The captive nut is captivated to the heat sink base and is allowed to float up and down within a range of movement through a respective hole in the heat sink base under the movement of the spring.

A nut includes an internal stop shoulder adjacent its internal threads. An upstanding stud includes a chamfered leading end, a threaded section thereafter, and a projecting shoulder below, i.e., following, the threaded section. Each nut is tightened onto its respective stud until the projecting stud shoulder and the nut stop shoulder engage. This engagement defines the travel distance of the nut onto the stud and sets the preload force on the tie-down spring. By fully tightening each nut the heat sink is uniformly held onto the IC chip.

Factors which are considered when calculating the tie-down force of the springs to hold the heat sink to the IC chip include the size and length of the spring, the spring (material) strength and flexure characteristic, the coil spacing and its force verses movement characteristics, and the preload compression distance. The preload compression distance is how far the nut is permitted to travel until the assembly is tight and fully seated. This in turn is a function of the length of the threads on the nut, the location of the nut's stop shoulder, and the location of the studs projecting shoulder.

Each captive nut is T-shaped with a head portion and a shank portion. The head portion has a larger outside diameter than the shank portion. The compression spring is mounted to extend about the shank portion.

A peripheral rib extends like an external ring on the outside wall of the shank portion adjacent the head portion. This forms an undercut about the shank where the end coil loop of the spring can be entrapped and held to abut the bottom face of the head. This permits the spring to be pre-assembled onto the T-shaped nut and carried thereon during the further assembly of the invention.

The head member can have a Phillips, a slotted, an Allen wrench, a TORX, a hex head or other type of top face shape for receiving a tightening tool. The shank portion may be a solid dowel-type member with a bore drilled or otherwise formed longitudinally into it from its leading end. The bore is threaded to engage the threads of an upstanding PC board mounted stud. A section of the bore, outboard of the threads is counter-bored to a larger inside diameter to form the nut's stop shoulder.

This counter-bored section of the shank forms a tubular structure which is integral with and a continuous part of the rest of the nut. This tubular section has a thinner wall thickness than the threaded section.

The tip of the free end of the tubular section is further counter-bored to an even larger inside diameter. This tip, free end is flared once the shank of the nut is inserted through the hole in the base of the heat sink to captivate the nut and spring sub-assembly to the heat sink base. The second, or larger counter-bore creates the thinnest wall section and thereby controls the length of the tubular section which is flared. This in turn, affects the shape and size of the flare.

Each PC board mounted threaded stud has a press fit anchor-type head and carries an adjacent peripheral groove which with the head anchors the stud into the PC board. The stud can have a plain cylindrical rod section extending from the mounting head. This section is a solid, dowel-type member. The leading upward end of the dowel section has its outside diameter reduced to form the projecting shoulder which engages the nut stop shoulder. The reduced (inside diameter) I.D. portion is threaded to mate with the nut threads.

The flaring of the nut, and its successively step-in receiving sections provide a self-centering function for mating the nut and stud.

The structure of the T-shaped nut and the structure of the PC board mounted upstanding stud can be varied and still provide the operation and function of the present invention. Departures in the shape of the threaded stand-off stud may also be used and still provide the operation and function of the present invention. What is required is that the nut movement is stopped on the stud prior to the stud bottoming out on the threads of the nut, or conversely, the nut bottoming out on the base end of the stud. This movement stop will allow the threads be turned further, once the stop is reached, to provide a torque on the threads which slightly deforms them and establishes a pressure to provide a positive tightened assembly which resists loosening under vibration.

BRIEF DESCRIPTION OF THE DRAWINGS

The features, advantage and operation of the present invention will become readily apparent and further understood from a reading of the following detailed description with the accompanying drawings, in which like numerals refer to like elements, and in which.

DETAILED DESCRIPTION OF THE INVENTION

The present invention is a captive shoulder nut assembly having a nut member including a spring tie-down. The nut member passes through a plate on a heat sink and mates with and threaded stud mounted on a PCI board (peripheral component interconnect board) or a PC board (printed circuit board). The heat sink is thereby held to an IC device (integrated circuit device or microchip) or other electronic module mounted on the board with a pre-determined spring force.

Figure 1:
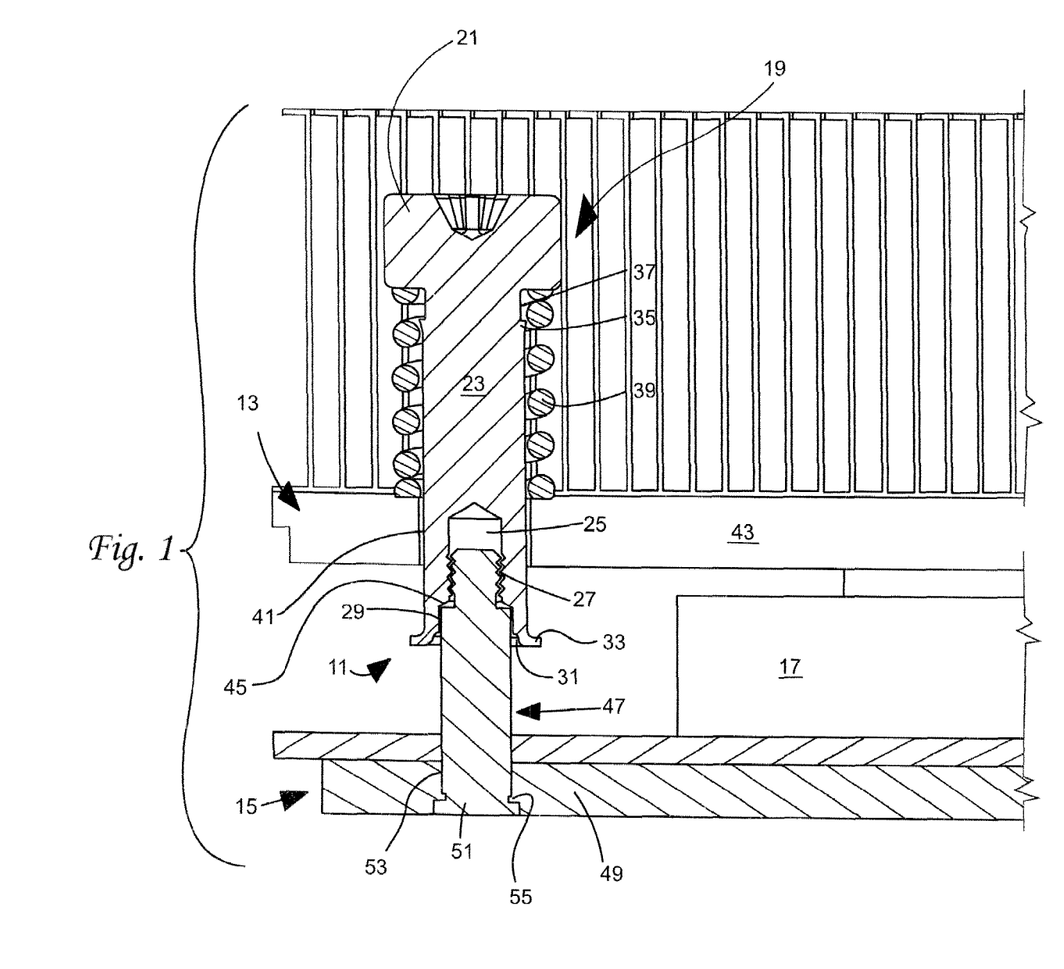
FIG. 1 is a side elevation, partial cut-away, partial cross-section of the captive shoulder nut assembly holding a heat sink onto a PC board.
Figure 2:
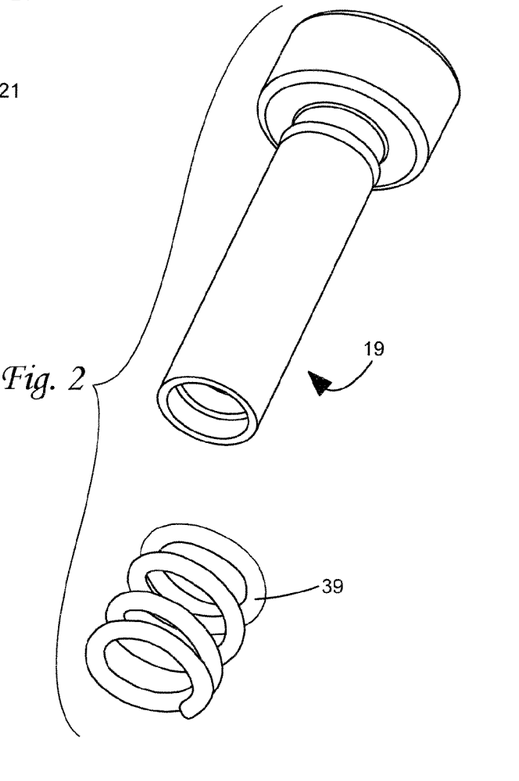
FIG. 2 is an exploded perspective assembly view of the captive T-shaped nut and spring sub-assembly, of FIG. 1, prior to installation and flaring.
Figure 3A:
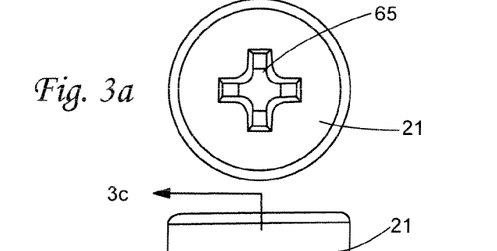
FIG. 3a is a top view of the head of the T-shaped nut of FIG. 2.
Figure 3B:
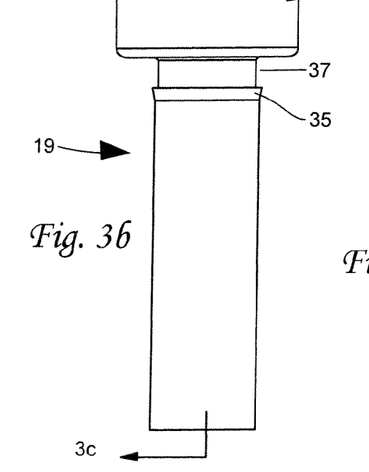
FIG. 3b is a side view of the T-shaped nut of FIG. 2.
Figure 3C:
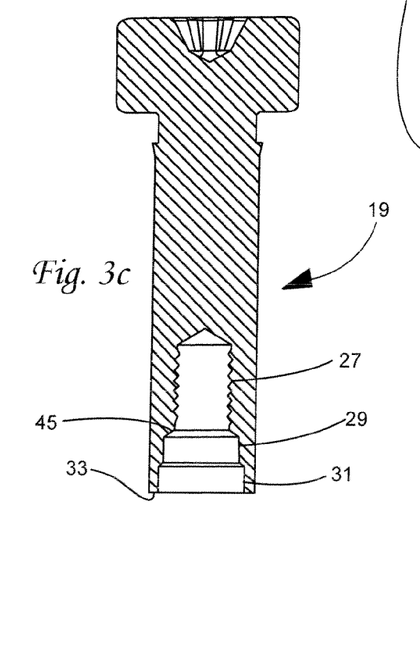
FIG. 3c is a cross-sectional view of the T-shaped nut taken as shown in FIG. 3b.

A captive shoulder nut assembly 11, FIG. 1, is suitable for holding a heat sink 13 onto a PC board 15 over an electronic module (IC module) 17 mounted to the PC board 15. The assembly 11 has a nut member 19 which is T-shaped. The head portion 21 of the nut 19 leads to a cylindrical-shaped shank portion 23. The shank portion 23 is a solid, dowel-like structure with a bore 25 extending longitudinally down its centerline.

The bore 25 has a threaded section extending from the root of the bore 25. A first counter-bored section 29 outboard of the threaded section 27 provides a first enlarged inside diameter section 29 leading into the threaded section 27. A second, further counter-bored section 31 is outboard of the first counter-bored section 29 and provides a second further enlarged inside diameter section 31 leading into the first counter-bored section 29

Each counter-boring successively reduces the wall thickness. At the second counter-bored section 31 the wall thickness forms a tubular section which is capable of being flared at the end 33 thereof. This succession of structural changes lends to the nut self-centering onto a mating stud 47 discussed below. The lead-in diameter to the threaded portion 27 of the bore 25 is reduced in a succession of steps.

A ramped section forms an external rib or ring 35 on the shank portion 23 adjacent the head portion 21. This space between the underside of the head 21 and the ring 35 defines a retaining groove 37 in the outside of the nut member 19 just below the face of the head portion 21. A biasing compression spring 39 is positioned over the shank portion 23 to have an end coil loop thereof secured within the retaining groove 37. The tubular portion 31 as well as the first counter-bored section 29 and the threaded section 25 of the nut are suitable to be inserted through a straight hole 41 in the base 43 in the heat sink 13. The inner diameter of the spring 39 is larger than the diameter hole 41 and thereby the spring remains above the hole 41 and operates against the heat sink base 43.

The second counter-bored tubular, outermost section 31 is flared at its end 33 with a flaring tool after the nut 19 and spring 39 sub-assembly is mounted in the hole 41 to extend partially below the heat sink base 43. The sub-assembly is thusly made captive to the heat sink base 43 with the nut being movable upward and downward in the hole 41 against the spring force of the biasing spring 39.

The change in inside diameter between the threaded section 27 and the first counter-bored section 29 forms a stop shoulder 45 within the nut 19 at the inboard end of the first counter bore section 29.

The nut member 19 is capable of mating with an upstanding threaded stud 47 attached to the PC board 15 at its underlay backing 49. Each threaded stud 47 has a press fit anchor-type head 51 which is press fit into the backing 49 after the stud 47 is pushed through a hole 53 in the board. A peripheral groove 55 adjacent the head 51 deforms the underlay backing 49 material and anchors the stud 47 into the PC board.

Figures 4, 5:
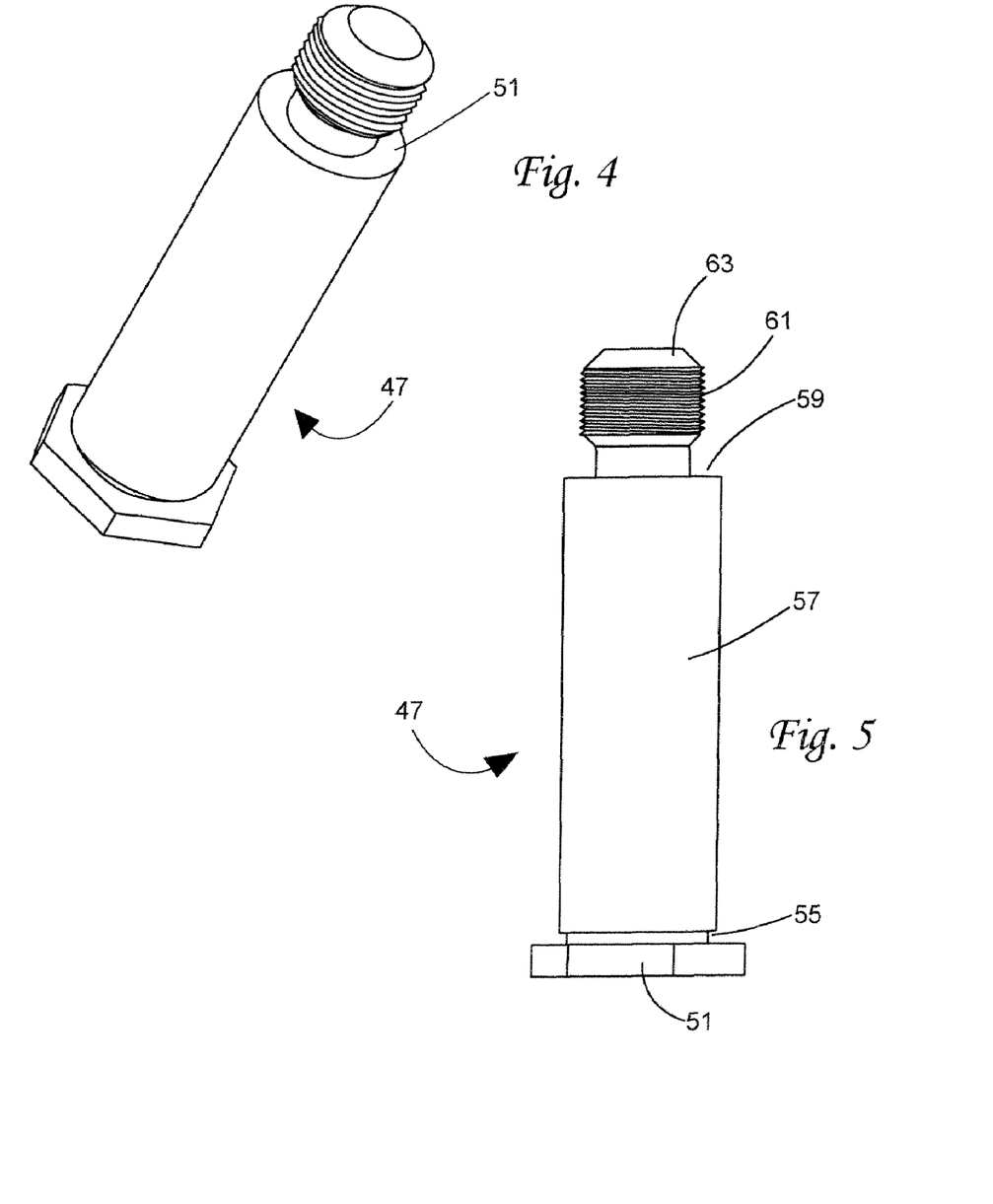
FIG. 4 is a perspective view of the stud of FIG. 1.
FIG. 5 is a side view of the stud of FIG. 4.

The stud 47, FIG. 5, can have a plain cylindrical rod section 57 extending from the mounting head 51. This section 57 is a solid, dowel-type member. The leading upward end of the dowel section has its outside diameter reduced to form the projecting shoulder 59 which engages the nut stop shoulder 45. The reduced I.D. portion is threaded to form a threaded section 61 of the stud 47 to mate with the nut threads 27. The outermost lead end of the threaded section 61 is chamfered 63.

The top of the head 21 portion of the T-shaped nut member 19 carries a Phillips socket 65 for a Phillips driver.

The details of the T-shaped nut 19, the compression spring 39, and the board mounted stud 47 are further shown in FIG. 2, FIGS. 3a-3c, and FIG. 4.

The invention provides: (1) that the nut movement is stopped on the stud prior to the stud bottoming-out on the threads of the nut, or conversely, the nut bottoming out on the base end of the stud; (2) the movement stop allows the threads be turned further, once the stop is reached, to provide a torque on the threads which slightly deforms them and establishes a pressure to affect a locked-thread assembly which resists loosening under vibration; (3) an alignment lead-in to the threaded bore of the nut is effected by a succession of increasingly larger under cuts leading to the free end of the nut; (4) that the hold-down spring rides with the nut during assembly; and (5) that the free-end or outboard undercut section has a wall which can be flared outwardly to capture the nut onto the heat sink base.

Many changes can be made in the above-described invention without departing from the intent and scope thereof. It is therefore intended that the above description be read in the illustrative sense and not in the limiting sense. Substitutions and changes can be made while still being within the scope and intent of the invention and of the appended claims.

What is claimed is:

1. A captive shoulder nut assembly, for holding the base of a heat sink onto a PC board, comprising:
    a nut member having a head portion and a tubular portion extending from said head portion, said tubular portion having an internal bore along a partial length thereof and carrying threads;
    a compression spring positioned about the outside of said tubular portion and having an end thereof secured to the nut member; and
    a threaded stud positioned on said PC board and upstanding therefrom;
    wherein said heat sink base includes at least one hole positionable over said upstanding stud; and
    wherein said nut member tubular portion is extensible through said heat sink base hole and the end of said tubular portion is capable of being flared outwardly beyond the size of said heat sink base hole for captivating said nut member to said heat sink base.

2. The captive shoulder nut assembly of claim 1, wherein said nut member is T-shaped.

3. The captive shoulder nut assembly of claim 2, wherein said nut member partial internal bore includes a partial threaded portion.

4. The captive shoulder nut assembly of claim 3, wherein said internal bore includes a first counter bore section outboard of said threaded portion, said first counter bore section having an increased inside diameter from said internal bore.

5. The captive shoulder nut assembly of claim 4, also including a stop shoulder at the inboard end of said first counter bore section.

6. The captive shoulder nut assembly of claim 5, also including a second counter bore section outboard of said first counter bore section, said second counter bore providing an even larger inside diameter in that section, wherein said second and first counter bore sections provide a stepped lead-in to said threaded bore section.

7. The captive nut assembly of claim 6, wherein said second counter bore section reduces said wall thickness to form a tubular section suitable for flaring.

8. The captive nut assembly of claim 7, wherein said upstanding threaded stud includes a threaded section at its free end and a projecting shoulder at the transition between said threaded section and the remainder of the stud.

9. The captive nut assembly of claim 8, wherein said nut member threaded bore section mates with said stud threaded section and is threadedly engage to where said nut stop shoulder abuts said stud projecting shoulder.

10. The captive nut assembly of claim 9, wherein said spring diameter is larger than said heat sink base hole wherein said spring is compressed as said nut is threadedly screwed onto said stud.

11. The captive nut assembly of claim 10, wherein the abutment of said nut stop shoulder and said stud projecting shoulder establishes the maximum spring hold down force exerted by said spring on said heat sink base.

12. The captive nut assembly of claim 11, wherein said captive nut assembly and said held down heat sink can float on said PC board under thermal changes thereof.

13. A captive shoulder nut assembly, for holding down the base of a heat sink onto a PC board, comprising:
    a stud upstanding from said PC board carrying threads on a portion of the length extending from the free end thereof;
    wherein said heat sink base carries a hole fitting over said stud for mounting said base thereon;
    a T-shaped threaded nut having a head and cylindrical-shaped shank member extending therefrom, said shank member having bore with a threaded bore portion adjacent the root of the bore and a plurality of enlarged bore diameter stepped sections outboard therefrom, said theaded bore portion being matable with said threaded stud; and
    a spring positioned about said shank member and attached thereto to operate against the face of said heat sink base which is away from said PC board.

14. The captive shoulder nut assembly of claim 13, wherein the outer wall of said shank member is continuous, wherein said plurality of enlarged bore diameter sections result from successively larger undercuts which yield successively thinner shank wall thickness progressively outboard from said threaded bore portion, wherein said extreme outboard will thickness is tubular suitable for flaring outwardly.

15. The captive nut assembly of claim 14, also including a stop shoulder at the inboard end of said first enlarged bore diameter step section.

16. The captive nut assembly of claim 15, also including a projecting shoulder extending outwardly adjacent the base of said threaded length portion.

17. The captive nut assembly of claim 16, wherein when said nut is threaded on said stud said stop shoulder can abut said projecting shoulder thereby limiting said thread progress and determining said spring compression, wherein said nut may thereafter be further torqued on said stud to slightly deform the threads and provide a locked-thread which resists loosening under vibration.

* * * * *

UNITED STATES PATENT AND TRADEMARK OFFICE
CERTIFICATE OF CORRECTION

PATENT NO. : 7,342,796 B2
APPLICATION NO. : 11/419868
DATED : March 11, 2008
INVENTOR(S) : Thomas V. Aukzemas It is certified that error appears in the above-identified patent and that said Letters Patent is hereby corrected as shown below:

Column 1, line 47, replace "and" with --an--;

Column 2, line 23, replace "," with --.--;

Column 4, line 18, replace "and" with --a--;

Column 4, line 39, insert a period --.-- after "29";

Column 6, line 27, replace "engage" with --engaged--;

Column 6, line 63, replace "will" with --wall--.

Signed and Sealed this

Twenty Second Day of April, 2008

JON W. DUDAS
*Director of the United States Patent and Trademark Office*